United States Patent
Dhake et al.

(10) Patent No.: US 11,390,144 B2
(45) Date of Patent: Jul. 19, 2022

(54) AIR OUTLET FOR CONTROLLING AN AIR FLOW

(71) Applicant: FORD GLOBAL TECHNOLOGIES, LLC, Dearborn, MI (US)

(72) Inventors: Abhinav Dhake, Aachen (DE); Julius Maximilian Engelke, Aachen (DE); Volker Scheer, Roetgen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 16/142,790

(22) Filed: Sep. 26, 2018

(65) Prior Publication Data
US 2019/0092142 A1 Mar. 28, 2019

(30) Foreign Application Priority Data
Sep. 26, 2017 (DE) .......................... 102017217085.9

(51) Int. Cl.
*B60H 1/34* (2006.01)
(52) U.S. Cl.
CPC ... *B60H 1/3442* (2013.01); *B60H 2001/3471* (2013.01)
(58) Field of Classification Search
CPC ..................... B60H 1/3442; B60H 2001/3471
USPC ........................................................ 454/154
See application file for complete search history.

(56) References Cited

U.S. PATENT DOCUMENTS

| 4,824,023 A | * | 4/1989 | Sugawara | F24F 13/06 239/509 |
| 5,318,104 A | * | 6/1994 | Shah | G05D 23/1934 165/208 |
| 5,860,593 A | | 1/1999 | Heinle et al. | |
| 6,170,274 B1 | * | 1/2001 | Ichishi | B60H 1/345 62/179 |
| 6,719,623 B1 | | 4/2004 | Kodaveridan et al. | |
| 2008/0112155 A1 | * | 5/2008 | Scown | B60H 1/3442 362/96 |

(Continued)

FOREIGN PATENT DOCUMENTS

| DE | 102006053836 A1 | 5/2005 |
| DE | 102006054847 A1 | 5/2008 |
| DE | 102007059190 A1 | 3/2009 |

(Continued)

OTHER PUBLICATIONS

EP 2181874 MT, machine translation of EP 2181874 A1 (Year: 2010).*

(Continued)

*Primary Examiner* — Allen R. B. Schult
(74) *Attorney, Agent, or Firm* — Vichit Chea; Price Heneveld LLP

(57) ABSTRACT

An air outlet for controlling an air flow has a ventilator housing and a direction and diffuser arrangement received in the ventilator housing. An air channel is formed by the ventilator housing and the direction and diffuser arrangement. In order to adjust flow properties of the air flow, the direction and diffuser arrangement is constructed so as to be able to be moved in a rotational manner about a center axis of the ventilator housing and/or moved in translation along the center axis of the ventilator housing and/or pivoted relative to the center axis of the ventilator housing.

7 Claims, 1 Drawing Sheet

(56) References Cited

U.S. PATENT DOCUMENTS

2009/0047892 A1 2/2009 Brancheriau et al.
2016/0089959 A1* 3/2016 Bouldron ............ B60H 1/3442
                                                             454/155

FOREIGN PATENT DOCUMENTS

| DE | 102009021663 | A1 | | 12/2009 | | |
|---|---|---|---|---|---|---|
| DE | 102010049110 | A1 | | 6/2011 | | |
| DE | 202012100980 | U1 | | 5/2012 | | |
| DE | 102012006339 | A1 | | 11/2012 | | |
| DE | 102013100534 | A1 | | 7/2013 | | |
| DE | 102014200544 | A1 | | 7/2014 | | |
| DE | 102013100534 | B4 | | 2/2015 | | |
| DE | 102015017008 | A1 | | 7/2017 | | |
| EP | 2181874 | A1 | * | 5/2010 | ............ | B60H 1/3442 |
| WO | WO-2015140808 | A1 | * | 9/2015 | ............ | B60H 1/3442 |

OTHER PUBLICATIONS

English Machine Translation DE102007059190A1 dated Mar. 19, 2009.
English Machine Translation DE102013100534A1 dated Jul. 25, 2013.
English Machine Translation DE102014200544A1 dated Jul. 24, 2014.
English Machine Translation DE202012100980U1 dated May 23, 2012.
English Machine Translation of DE102013100534B4 dated Feb. 19, 2015.
English Machine Translation of DE102006053836A1 dated May 15, 2008.
English Machine Translation of DE102015017008A1 dated Jul. 6, 2017.
English Machine Translation of DE102010049110A1 dated Jun. 9, 2011.
English Machine Translation of DE102006054847A1 dated May 21, 2008.
English Machine Translation of DE102009021663A1 dated Dec. 24, 2009.
English Machine Translation of DE102012006339 A1 dated Nov. 8, 2012.
Office Action dated Jun. 2, 2021 for DE Application No. 102017217085.9 filed Sep. 26, 2017.

* cited by examiner

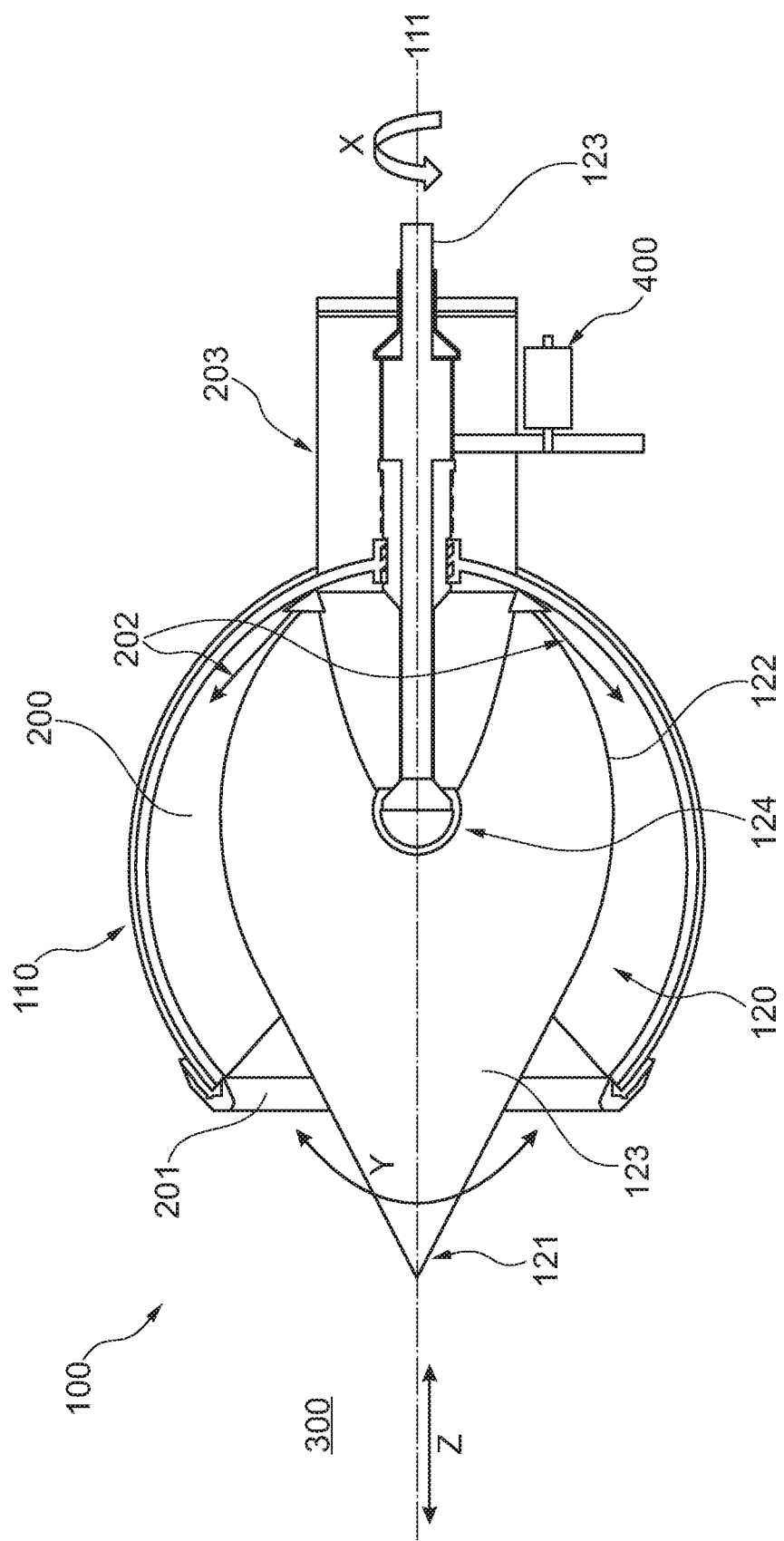

AIR OUTLET FOR CONTROLLING AN AIR FLOW

TECHNICAL FIELD

This document relates to an air outlet or a fan for the passenger compartment of a motor vehicle, in particular a passenger motor vehicle, as well as to a direction and diffuser arrangement for an air outlet.

BACKGROUND

An important aspect in the construction of motor vehicles, in particular in passenger motor vehicles, is the driver or passenger comfort in the passenger compartment. A proven means for increasing this comfort is the automation of extremely different functions. Automatic window openers, automatic speed regulation systems, but also automatic parking systems have thus already been known for some time. For the well-being of the driver or a passenger, the air-conditioning of the passenger compartment is a decisive factor. This is usually carried out by means of air outlets or fans. To this end, an end of the air flow channel facing the passenger compartment has control slats or an air guiding grid for controlling the air discharge direction or throttle or closure devices for adjusting the quantity of air flow being discharged. The air flow is air-conditioned before being introduced into the air outlet, that is to say, cooled or heated. By pivoting the slats, the air-conditioned air flow can be directed onto the body portion which is intended to be heated or cooled.

For example, DE 10 2007 059 190 A1 discloses an air outlet which is for ventilating or air-conditioning the inner space of a vehicle and which comprises horizontally arranged slats, by means of which the direction of the air flow discharged from the air outlet can be varied. In order to adjust the discharge direction and the volume flow of the air discharged from the air outlet, the air outlet has an actuation element. The volume flow is adjusted by means of a first actuation movement and the discharge direction of the air discharged from the air outlet is adjusted by means of a second actuation movement. By means of the actuation element, the intensity and direction of the discharged air flow can consequently be manually adjusted.

A device for manually controlling an air flow from an air outlet by means of slats is also known from DE 10 2013 100 534 B4. Both the operating element and the adjustment means are arranged inside the air outlet. In order to control the air flow, a change of the orientation of the slats which extend horizontally in a first direction and vertically in a second direction is carried out. The orientation of the slats is carried out in each case by means of the circular operating element. DE 20 2012 100 980 U1 discloses a similar device for controlling an air flow from an air outlet. In addition, in this instance the quantity of the discharged air can be controlled by means of a closure device. The control of the closure device is carried out by means of an operating wheel which surrounds the operating element.

DE 10 2014 200 544 A1 discloses another embodiment of a slat-like device which can be manually operated in order to control an air flow from an air outlet. Accordingly, pivotable slats extend in a first and in a second direction. In order to control the air flow, the orientation of the slats is changed by the slats which extend in the first direction being pivoted about an axis which extends in the second direction and the slats which extend in the second direction being pivoted about an axis which extends in the first direction. A change of the slat orientation is controlled by means of an operating element of the device which is connected in a rotationally secure manner to a first ball socket. The first ball socket is in turn rotatably supported in a receiver socket. The device further has a pivotable closure device which can be moved by means of a rotational movement of the operating element from an open state into a closed state.

Automatically adjustable air directing devices are known, for example, from U.S. Pat. No. 5,860,593 A. In this publication, an air channel of a vehicle air-conditioning device has one or more discharge nozzles each having an automatically adjustable air directing device, in particular air directing grids. The respective air directing device can be controlled by the air-conditioning control unit. Depending on the solar radiation, the air-conditioning control unit produces control commands for automatically adjusting the air directing device which is associated with a seat so that the air-conditioned cooling air can be selectively directed to those seat regions/body regions which are subjected to the intensive solar radiation.

Finally, U.S. Pat. No. 6,719,623 B1 discloses a device for controlling an air flow for a passenger cabin of an aircraft. The device has an air nozzle which is connected in the manner of a ball and socket joint to a housing. The air nozzle has an air flow channel having an inlet end and an outlet end, wherein air-conditioned air is introduced into the inlet end and is discharged from the outlet end. By means of an electric motor, the orientation of the outlet end and consequently the air discharge direction can be changed by the nozzle being deflected with respect to the housing by means of the ball joint. In order to adjust the volume flow of the air which is blown out, the device has another electric motor. The electric motor controls a position of a pivotable throttle valve in order to increase or decrease the discharge cross-sectional surface-area of the nozzle.

In view of the prior art set out, the configuration of an air outlet for controlling an air flow still leaves room for improvement. The disadvantage of the prior art is, for example, the often manual operation which involves frequent readjustment of the settings, for example, when the seat is displaced. Furthermore, as a result of the slat-controlled discharge direction of the air flow, only a very localized air-conditioning is achieved, which leads to an uncomfortably powerful heating or cooling of individual body parts, for example, the hands gripping the steering wheel and/or body regions. This can also only be avoided by means of frequent adjustment of the discharge direction of the air flow. Furthermore, the distribution of the air which is intended to be cooled or heated in the passenger compartment is locally limited as a result of the powerfully directed air flow, which leads to regions with significantly different temperature within the passenger compartment. Another disadvantage is the often high volume of the fan with a non-diffuse air flow which is discharged in a directed manner.

SUMMARY

An object of this document is to provide an air outlet for controlling an air flow which enables improved air-conditioning and/or reduced noise production and thus increased comfort within a passenger compartment.

This object is achieved with an air outlet for controlling an air flow as well as with a direction and diffuser arrangement for an air outlet having the features of the following claims.

It should be noted that the features and measures set out individually in the following description can be combined with each other in any technically advantageous manner and set out other embodiments of the air outlet. The description further characterizes and specifies the air outlet in particular in connection with the Figures.

There is proposed an air outlet for controlling an air flow, in particular for air-conditioning and/or ventilating a passenger compartment of a motor vehicle, having a flow inlet which can be connected to an air flow supply, a ventilator housing for receiving a direction and diffuser arrangement which can be moved therein and at least one flow outlet which faces into an environment. An air channel, which connects the at least one flow inlet and the at least one flow outlet in fluid directing terms, is delimited by the ventilator housing and the direction and diffuser arrangement. The housing of the air outlet and the direction and diffuser arrangement are in other words arranged with respect to each other in such a manner that a flow channel is produced between an outer face of the direction and diffuser arrangement and an inner face of the ventilator housing.

In order to adjust flow properties of the air flow, the direction and diffuser arrangement is constructed so as to be able to be moved in a rotational manner about a center axis of the ventilator housing and/or moved in translation along the center axis of the ventilator housing and pivoted relative to the center axis of the ventilator housing. Thus, the direction and diffuser arrangement is able to be deflected through an angle with respect to the center axis of the ventilator housing. By the direction and diffuser arrangement being constructed so as to be able to be moved relative to the housing, the geometry of the air channel and/or the flow outlet opening can be changed in order to adjust the flow properties, in particular in order to adjust the flow speed and/or the volume flow and/or the flow discharge direction and/or the diffusivity of the flow.

According to a preferred embodiment, the direction and diffuser arrangement has at least in a front portion which faces into the environment, in particular into the passenger compartment, a conical form which is constructed in a basic or starting position of the direction and diffuser arrangement in a substantially rotationally symmetrical manner about the center axis of the ventilator housing. In the basic and starting position, the center axis of the direction and diffuser arrangement is orientated in a substantially congruent manner relative to the center axis of the ventilator housing and a rear portion of the direction and diffuser arrangement abuts an inner side of the ventilator housing. Advantageously, the front portion protrudes from an opening of the ventilator housing and delimits together therewith the flow outlet of the air channel. As a result of a translational movement of the front portion along the center axis of the ventilator housing, in this manner the cross-sectional surface-area of the flow outlet can be increased or decreased.

Preferably, the direction and diffuser arrangement in order to control the discharge direction of the air flow can be pivoted relative to the center axis of the ventilator housing, that is to say, deflected through an angle relative to the center axis and/or in order to control the flow speed and/or the volume flow and/or the diffusivity can be moved in translation along the center axis of the ventilator housing. As a result of pivoting the direction and diffuser arrangement relative to the center axis of the ventilator housing, an asymmetrical annular gap is produced as a cross-sectional surface-area of the flow channel, whereby the discharge direction of the air flow can be adjusted. By means of the translational movement, the cross-sectional surface-area of the flow discharge can be decreased: the smaller the cross-sectional surface-area, the higher the flow speed is and the more directed the air flow is, whereas a larger cross-sectional surface-area results in a lower flow speed and consequently an increased diffusivity. As a result of a regularly recurring translational movement, a so-called "pumping action" of the direction and diffuser arrangement, the diffusivity of the air flow can be further increased.

A particularly high diffusivity of the air flow can be produced by the direction and diffuser arrangement in order to control the diffusivity being pivoted relative to the center axis of the ventilator housing, that is to say, the direction and diffuser arrangement is deflected from its basic or starting position, and is at the same time driven in rotation about the center axis of the ventilator housing and/or is driven in translation along the center axis of the ventilator housing. When the direction and diffuser arrangement is rotated and deflected from its basic or starting position at the same time, the front portion which is preferably constructed in a conical manner carries out a type of tumbling movement, whereby an increased diffusivity is produced within the discharged air flow. By means of additional "pumping", that is to say, by means of an additional translational movement which recurs regularly and/or rhythmically, the diffusivity can be increased even further.

In order to actively or automatically control at least the translational and/or rotational movement of the direction and diffuser arrangement, an actuation motor may be provided. The actuation motor can be programmed to carry out different control processes, for example, by means of a memory-programmable control. In particular, the actuation motor is programmed to carry out control processes which result in a periodically recurring movement of the direction and diffuser arrangement. A vehicle occupant can consequently, for example, activate the diffuser function, whereby the direction and diffuser arrangement pivots, rotates and/or "pumps" into a deflected position. Depending on the diffusivity desired, the speed of the rotation and/or the "pumping" can be increased or decreased.

At least the pivoting of the direction and diffuser arrangement relative to the center axis of the ventilator housing and/or at least a deflection of the direction and diffuser arrangement from the basic or starting position through an angle relative to the center axis of the ventilator housing may alternatively also be able to be carried out or adjusted manually. Optionally or alternatively, the translational movement of the direction and diffuser arrangement along the center axis of the ventilator housing and/or at least a deflection of the direction and diffuser arrangement from the basic or starting position by a distance along the center axis of the ventilator housing may be able to be carried out or adjusted manually.

In order to achieve the objective, a direction and diffuser arrangement for an air outlet, which can be used to control an air flow into a ventilator housing of the air outlet, and with this an air channel which has at least one flow inlet and at least one flow outlet is also formed.

According to at least one embodiment, the direction and diffuser arrangement can be supported in an articulated manner, preferably in the manner of a ball joint, in the ventilator housing in such a manner that the direction and diffuser arrangement in order to change the geometry of the air channel can be moved in rotation about a center axis of the ventilator housing and/or in translation along the center axis of the ventilator housing and can be pivoted relative to the center axis of the ventilator housing. Preferably, the direction and diffuser arrangement has a spherical head and a corresponding ball socket, which together form a ball joint which can be connected thereto so as to be able to be moved in translation so as to protrude into the inner side of the ventilator housing. Furthermore, it is advantageous for the direction and diffuser arrangement at least in a portion which faces into the environment to have a conical shape which is constructed in a basic or starting position of the direction and diffuser arrangement in a substantially rotationally symmetrical manner about the center axis of the ventilator housing. A rear portion of the direction and diffuser arrangement which is arranged opposite the front portion is advantageously constructed with a ball-like geometry and adapted to the inner space geometry of the ventilator housing.

BRIEF DESCRIPTION OF THE DRAWING FIGURES

Other advantageous embodiments of the air outlet are disclosed in the following description of the single FIGURE, in which:

FIG. 1 is a schematic sectioned side view of an exemplary embodiment of the new and improved air outlet in a basic or starting position.

DETAILED DESCRIPTION

FIG. 1 is a schematic sectioned side view of an exemplary embodiment of a new and improved air outlet 100 in a basic or starting position. The air outlet 100 has a substantially spherical ventilator housing 110 and a direction and diffuser arrangement 120 which is arranged coaxially relative to the center axis 111 thereof. The ventilator housing 110 forms, together with the direction and diffuser arrangement 120, an air channel 200. The flow outlet 201 of the air channel 200, facing an environment 300, is delimited in the manner of an annular gap by a conical front portion 121 of the direction and diffuser arrangement 120 and an opening of the ventilator housing 110. A rear portion 122 of the direction and diffuser arrangement 120 abuts an inner face of the ventilator housing 110 and is surrounded by a flow inlet 202 of the air channel 200. The flow inlet 202 is connected to an air supply channel 203 in a fluid directing manner. The rear portion 122 of the direction and diffuser arrangement 120 is constructed in a substantially spherical manner.

The direction and diffuser arrangement 120 further has a ball joint 124 which is supported by means of a spherical rod 123 which is constructed as a shaft so as to be able to be moved in translation along the center axis 111 in the direction of the arrow Z relative to the ventilator housing 110. The spherical rod 123 is driven in translation and rotation by means of an actuation motor 400. The rotational movement of the spherical rod 123 is carried out about the center axis 111 in accordance with the arrow X. In order to transmit the rotational movement of the spherical rod 123 to the direction and diffuser arrangement 120, it is possible to provide between the spherical head and the spherical socket of the ball joint 124, for example, a frictional engagement. A pivoting of the direction and diffuser arrangement 120 through an angle relative to the center axis 111 in accordance with the arrow Y is possible, for example, by means of manual actuation of a passenger or a driver.

The body 123 of the direction and diffuser arrangement 120 is carried on the ball joint 124. As illustrated in FIG. 1, the body is generally teardrop-shaped in cross section.

In summary, the direction and diffuser arrangement 120 is supported so as to be able to be moved, relative to the ventilator housing 110, in translation along the center axis 111, in the direction of the arrow Z, in rotation about the center axis 111 in the direction of the arrow X and so as to be able to be pivoted through an angle with respect to the center axis 111, in the direction of the arrow Y. By deflecting the direction and diffuser arrangement 120 from the basic or starting position thereof, either manually or by means of the actuation motor 400, in the respective directions of the arrows X, Y and Z, on the one hand, the geometry of the air channel 200 and, on the other hand, the geometry of the flow outlet 201 can be changed in order to control the air flow properties, such as volume flow, flow speed, diffusivity and/or discharge direction. By means of periodic and/or rhythmic deflection, occurrences of turbulence of the air flow which contribute to increased diffusivity can further be produced.

What is claimed:

1. An air outlet for controlling an air flow to a passenger compartment of a motor vehicle, comprising:
   a ventilator housing;
   a direction and diffuser arrangement received in said ventilator housing, wherein the direction and diffuser arrangement includes a body, a rod, and a ball joint carried on a distal end of said rod and coupled to the body, and wherein the rod is movable in a translational manner along a center axis of said ventilator housing and is movable in a rotational manner around the center axis of the ventilator housing, and wherein a translational movement of the rod drives a translational movement of the body and a rotational movement of the rod drives a rotational movement of the body, and wherein the direction and diffuser arrangement has a rear portion that abuts an inner surface of the ventilator housing;
   an air channel formed between said ventilator housing and said direction and diffuser arrangement, said air channel including a flow inlet that surrounds the rear portion and is connected to an air supply channel and at least one flow outlet facing into an environment wherein properties of said air flow exiting said air outlet are adjusted by displacing the body and the rod with respect to said ventilator housing in (a) a rotational manner around a center axis of said ventilator housing, (b) a translational manner along said center axis of said ventilator housing and by displacing the body in (c) a pivotal manner relative to said center axis of said ventilator housing; and
   an actuation motor Operably coupled to the rod, wherein the actuation motor drives the rod in a periodic rotational manner and translational manner, and wherein the periodic rotational manner and the translational manner of the rod drives the body in a periodic rotational manner and translational manner such that a turbulence in the air flow is generated.

2. The air outlet as claimed in claim 1, wherein the direction and diffuser arrangement has at least in a front portion which faces into the environment a conical form which is oriented in a substantially rotationally symmetrical manner about the center axis of the ventilator housing.

3. The air outlet as claimed in claim 2, wherein the direction and diffuser arrangement is pivoted relative to the center axis of the ventilator housing in order to control a discharge direction of the air flow.

4. The air outlet as claimed in claim 3, wherein the direction and diffuser arrangement is pivoted relative to the center axis of the ventilator housing in order to control the diffusivity, wherein the direction and diffuser arrangement is deflected from a starting position and is at the same time driven in rotation about the center axis of the ventilator housing or is driven in translation along the center axis of the ventilator housing.

5. The air outlet as claimed in claim 4, wherein at least the pivoting of the direction and diffuser arrangement relative to the center axis of the ventilator housing is carried out manually or at least a deflection of the direction and diffuser arrangement from the basic or starting position is manually adjusted through an angle relative to the center axis of the ventilator housing.

6. The air outlet of claim 1, wherein the rod is disposed within the flow inlet.

7. The air outlet of claim 1, wherein the body generally defines a teardrop shape, and wherein the rear portion defines a first cross-sectional area and the body defines a second cross-sectional area about the ball joint, and wherein the second cross-sectional area has a larger cross-sectional area than the first cross-sectional-area.

\* \* \* \* \*